US009087205B2

(12) United States Patent
Kremp et al.

(10) Patent No.: US 9,087,205 B2
(45) Date of Patent: Jul. 21, 2015

(54) SHARED ENCRYPTED STORAGE

(71) Applicants: Juergen Kremp, Walldorf (DE); Klaus Kiefer, Heidelberg (DE); Uwe Bauer, Weinsberg (DE)

(72) Inventors: Juergen Kremp, Walldorf (DE); Klaus Kiefer, Heidelberg (DE); Uwe Bauer, Weinsberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/051,776

(22) Filed: Oct. 11, 2013

(65) Prior Publication Data

US 2015/0106626 A1 Apr. 16, 2015

(51) Int. Cl.
G06F 12/14 (2006.01)
G06F 21/60 (2013.01)

(52) U.S. Cl.
CPC .................................. *G06F 21/602* (2013.01)

(58) Field of Classification Search
CPC ... H04L 9/0861; H04L 9/0894; H04L 9/3271; H04L 2209/60; H04L 9/083; H04L 9/3226; H04L 2209/80; H04L 2463/061; H04L 63/083; H04L 63/0869; H04L 9/0822; H04L 9/0825; H04L 9/0833; H04L 9/0863; H04L 9/0866; H04L 9/0897; H04L 9/321; G06F 21/10; G06F 2211/008; G06F 2221/0711; G06F 2221/0733; G06F 2221/0735; G06F 21/445; G06F 21/6209; G06F 21/6218; G06F 2211/007
USPC ..................... 713/150, 189; 380/44; 711/114; 714/764, 6.2
See application file for complete search history.

(56) References Cited

U.S. PATENT DOCUMENTS

| | | | |
|---|---|---|---|
| 8,667,284 B2 * | 3/2014 | Renganathan et al. ........ | 713/170 |
| 8,782,492 B2 * | 7/2014 | Resch et al. ................... | 714/764 |
| 2010/0058050 A1 * | 3/2010 | Aoki .............................. | 713/150 |
| 2013/0219189 A1 * | 8/2013 | Simmons ....................... | 713/189 |

\* cited by examiner

*Primary Examiner* — Thanhnga B Truong
(74) *Attorney, Agent, or Firm* — Fountainhead Law Group PC

(57) ABSTRACT

An improved key encryption system is provided for encrypting sensitive data on a shared data store. Various embodiments contemplate a system where a plurality of data clients are connected to one or more shared data stores. A secure data storage facility is provided on one or more of the shared data stores by using an encryption scheme. Encryption keys for decrypting the sensitive data are stored on the same data store as sensitive data which may be decrypted using the encryption keys in question. To provide another layer of protection, the data encryption keys are themselves encrypted using a key encryption key (KEK), which is generated by, and stored in a local persistent data store associated with the data clients.

14 Claims, 8 Drawing Sheets

SHARED ENCRYPTED STORAGE

BACKGROUND OF THE INVENTION

The invention disclosed herein relates generally to encryption. More specifically, the invention relates to encryption of data stored in a shared data store.

Unless otherwise indicated herein, the approaches described in this section are not prior art to the claims in this application and are not admitted to be prior art by inclusion in this section.

Providing security to sensitive information is of great importance to businesses. One technique for protecting information involves encrypting the data so that it can only be accessed by individuals or services with knowledge of the pertinent decryption mechanism. Encryption converts plain text into what is often called cipher text, which can only be read after it has been decrypted. Many encryption algorithms use an encryption key to perform such encryption and decryption.

In order to maintain the security of encrypted data, the encryption key must be kept secretly and safely. Should the encryption keys become compromised, the security of the entire data system is put in jeopardy.

Symmetric key encryption refers to a class of algorithms for cryptography that use the same cryptographic key for both encryption and decryption. The key is maintained as a shared secret between two or more parties and is used to maintain private information. The need to provide multiple parties with access to the same secret key is a challenge of symmetric key encryption.

Many configurations have been developed for storing data. According to one configuration, data may be stored in a central, shared data store and accessed by multiple client entities—for example, a group of application servers may each have access to a central data store. When sensitive or confidential information is stored on the data store, a key encryption scheme may be used to provide secure storage on the data store.

It would be advantageous to provide improved systems and techniques for encryption in the context of shared data stores.

BRIEF SUMMARY

Various embodiments of the present disclosure provide for shared encrypted storage with local persistence of the encryption key. In some embodiments, an encryption scheme is provided in the context of a data system that uses a shared data store by using a data encryption key (EK) which is itself encrypted, and is stored on the shared data store. Various embodiments also provide techniques for locally generating a key encryption key (KEK) at each client entity authorized to access the sensitive data. In some embodiments, the KEK is used to encrypt (and decrypt) the data encryption key EK stored on the shared data store, the data encryption key EK being the key actually used to encrypt and decrypt sensitive data stored on the shared data store In some embodiments, the KEK is generated by each client entity using a mathematical function that takes a registration password as a first input and a salt as a second input, the salt generated by a random number generator associated with the client entity.

In some embodiments, the encrypted EK is stored as part of a KEY file, which KEY file also includes meta data identifying the KEY file as one which contains an encrypted encryption key, as well as a checksum to be used for verifying the correctness of the KEK.

In some embodiments, the KEY file also contains a salt value in unencrypted form, the salt value corresponding to the randomly generated salt used as an input to the mathematical operation by which the KEK was generated.

In some embodiments, the KEK is generated using a registration password input by a system administrator.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION

Figure 1:
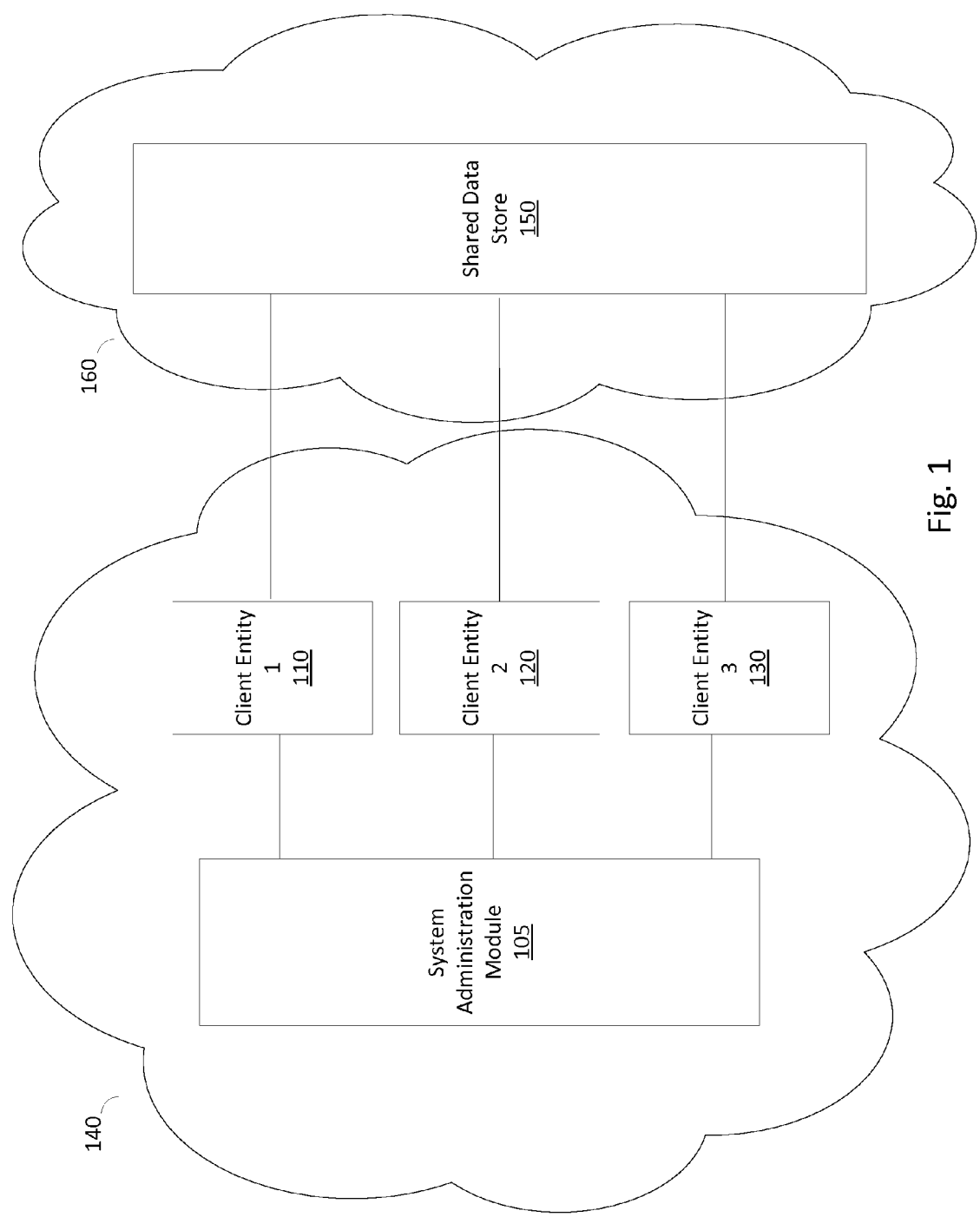
FIG. 1 is a block diagram presenting a network topology according to one embodiment of the present invention.

Described herein are techniques for shared encrypted storage with local persistence of the encryption key. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments of a method and system for shared encrypted storage with local persistence of the encryption key, in accordance with the present invention, are described herein with reference to the drawings in FIGS. 1 through 7.

A data store may store and allow for retrieval of data by multiple client entities. These client entities, for example, may be application servers that need to access and share data. They may comprise a distributed application server landscape. A system for allowing the application servers access to the data may be operated, set up and administered by a same administrator within a company.

The application servers may process user requests. As more users join the system, additional application servers may need to be added. The installation of new application servers may be coordinated, orchestrated, and authenticated by the same administrator or administration software.

In providing a secure storage on such and similar shared data stores, various embodiments locate the point of synchronicity at the administrator or administrating software in terms of setting up and maintaining the encryption system. One challenged faced in distributing and updating encryption keys at each client entity is ensuring secure and timely transmission of the keys. For example, in a situation where data is re-encrypted, once re-encrypted, every client entity with access to the data needs to be able to access an updated key more or less simultaneously and immediately in order to avoid data access disturbances and encryption confusion. Coordinating key distribution to occur in a timely fashion can be difficult to achieve.

In various embodiments, these challenges are addressed by performing the encryption and decryption at client entities, while storing the encryption key itself at the shared data store. Locating the encryption key at the shared data store resolves the problems associated with key distribution, but raises security concerns due to the encryption key being relatively exposed on the shared data store.

Accordingly, in some embodiments, encryption keys (EKs) stored on shared data stores are themselves encrypted, and the key encryption keys (KEKs) used to encrypt the data encryption keys EK are stored at the trusted client entities. The KEK's function is to convert the encryption key into a cipher text version of itself—the cipher text version of the encryption key being undecipherable without the key encryption key KEK.

That is, the encryption key is saved (in encrypted form) on the shared data store itself, and the key may be accessed by authorized trusted entities by retrieving the key (in encrypted form) from the shared data store, at the same time that any desired encrypted data is retrieved. Once the encrypted key EK is received at a client instance device, the client instance may use the key encryption key KEK, which is stored in a local persistent, protected storage of the client, to decrypt the encryption key EK. Once decrypted, the EK may be used to decrypt the encrypted data obtained from the shared data store.

The key encryption key (KEK) protects the centrally stored encryption key of the secure storage data. Various embodiments also provide techniques and mechanisms for generating and maintaining the KEKs at trusted client entities. According to one embodiment, generating the KEKs at the client entities involves use of a registration password or passphrase input by an administrator or administrating software—the same registration password or passphrase being used at each client entity who joins the secure encryption scheme.

The encryption scheme allows multiple client instances to access the same encrypted data stored in a secure shared data store, while the root key of the encryption is ultimately stored in a different entity, such as a local protected storage of each client instance.

Advantages of various embodiments of the present disclosure include that a data encryption key (EK) may be changed at runtime (i.e., while a data system is in operation) without a need to actively update a key, or any other data, at a client entity or client instance authorized to access sensitive data. As a result, the encryption and decryption of stored data can be optimized for security without concerns for key distribution.

In various embodiments, a further advantage includes providing a mechanism for secure storage on shared data stores even which can be implemented in connection with shared data stores which consist of simple data in and data out devices without any encryption/decryption capabilities.

Embodiments for shared encrypted storage with local persistence of the encryption key may be implemented in a wide variety of networking contexts. Turning to FIG. 1, a network topology comprising hardware and software components configured according to one embodiment of the present invention is illustrated. The network topology presented comprises a data system 100 including a first client entity 110, a second client entity 120, and a third client entity 130, each connected to a shared data store 150.

The first, second and third client entities 110, 120 and 130 may each comprise one or more servers (e.g., application servers) or other computing devices configured to retrieve and store data in shared data store 150. It is contemplated that the client entities may comprise a wide variety of computing devices, including, for example, any desktop computer, laptop, or even mobile device, with the capability of sending and retrieving data over a networked connection.

As noted above, client entities 110, 120 and 130 may comprise multiple physical hosts. In alternative embodiments, client entities 110, 120 and 130 may comprise multiple client instances instantiated on one or more physical hosts.

Shared data store 150 may consist of any shared medium where each client device or instance has the capability to store and/or retrieve data on the shared medium. It is contemplated that a wide variety of data repositories could be used to implement various embodiments of the present disclosure. For example, shared data store 150 could comprise a file system, a data base (e.g., a relational database, such as SAP Sybase Adaptive Server Enterprise (ASE), MySQL, PostgreSQL, Microsoft SQL Server, or Oracle Database), an object oriented database, or an in-memory database, such as SAP HANA), a distributed data store, or directory.

In some embodiments, shared data store 150 may take the form of a file system. This is a type of data store which provides a user with the capability to store, retrieve and alter a set of files. In such embodiments, encryption keys stored in shared data store 150, may be contained in files that are given a ".key" suffix. Such files will be referred to for ease of explanation as KEY files hereinafter. A KEY file may also include other elements, including for example, a salt, a checksum, as well as meta data identifying the KEY file as one which contains an encrypted data encryption key.

According to one embodiment implemented in connection with a file system data store, data stored in shared data store 150 may be stored in files having a suffix ".dat".

Various embodiments can handle multiple protocols, such as IP protocols, file service protocols, and block device protocols; multiple storage technologies such as Fiber Channel and Ethernet; and multiple services such as block, file, and database services. Implementations of various embodiments are contemplated which may use a variety of different storage technologies or different data transfer technologies.

All storage devices, as well as data clients, may be connected over a network, thereby allowing flexibility, expandability, and scalability of configurations.

According to one embodiment, each of the entities comprising data system 100 are located in a same network. The network may be a private network administered and/or operated by a particular company or enterprise. In other embodiments, data storage device 150 may be located on a third party network different from the network in which data client instances 110, 120 and 130 are located. As illustrated in FIG. 1, client entities 110, 120 and 130, along with the system administration module 105, are located in a first network 140, while shared data store 150 is located in a second network 160.

As noted above, in various embodiments, the encryption/decryption processes needed for protecting sensitive data are performed at client entities 110 and 120. Accordingly, as noted above, such processes can be transparent to shared data store 150. That is, shared data store 150 need have no encryption/decryption capability, or even knowledge that encryption and decryption are taking place, itself. Accordingly, in some embodiments, as illustrated in FIG. 1, shared data store 150 may be a data repository administered and operated by a different company from that which operates client entities 110, 120 and 130. For example, in one embodiment, shared data store 150 may even be a cloud based storage service that lets users upload files to a web-based server and share them with other users.

Figure 2:
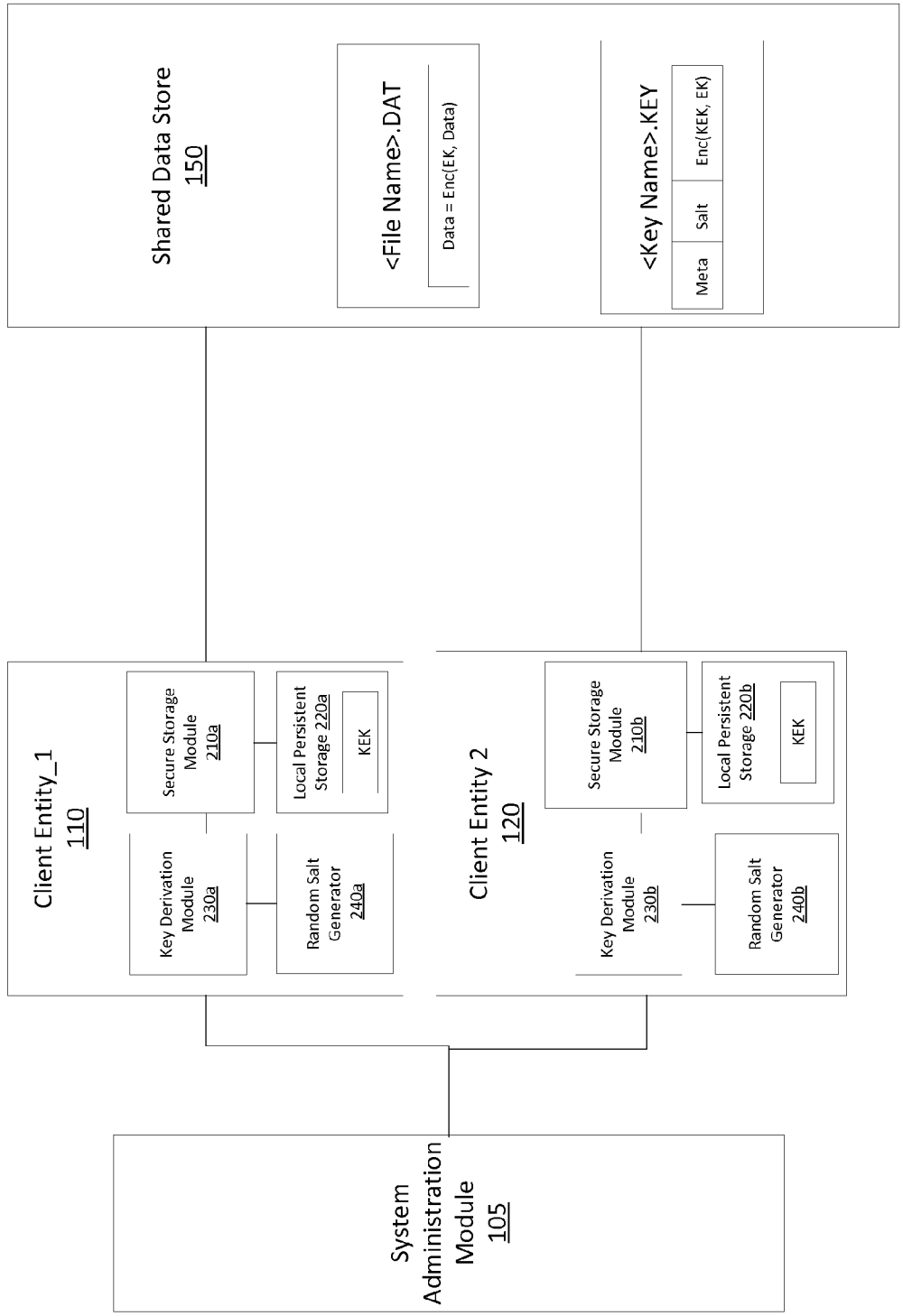
FIG. 2 is a block diagram presenting more detail regarding certain entities in the network topology depicted in FIG. 1 according to one embodiment of the present invention.

Embodiments of the above network topology may be implemented in a wide variety of network environments including, for example, Ethernet networks, TCP/IP-based networks, telecommunications networks, and wireless networks, etc or a combination of such networks FIG. 2 is a diagrammatic representation showing further detail regarding client entities 110 and 120 and shared data store 150. Client entities 110 and 120 may each include any suitable modules for calculating and storing a key encryption key (KEK) to be used for decrypting a data encryption key (EK) stored in shared data store 150, as discussed further herein.

As illustrated in FIG. 2, client entities 110 and 120 each includes
- a secure storage module 210 which may be used to provide for security for data stored by the client entity on shared data store 150. In some embodiments, the secure storage module is the entity that executes the key scheme,
- a local persistent storage (LPS) 220, a local storage structure at or associated with the client entity, which may be used to provide protected storage for data, and
- a key derivation module 230, which may be used to perform mathematical calculations, based at least in part on an input registration password, to generate a key encryption key (KEK). Note that in some embodiments, the key derivation module 230 may be a part of security storage module 210.

As illustrated in FIG. 2, client entities 110 and 120 also include:
- a random salt generator 240, which may be used to generate a salt value that is used by key derivation module 230 in generating a KEK.

The above components of client entities 110 and 120 operate together to set up and maintain a key encryption scheme for protecting sensitive data stored on shared data store 150.

Key derivation module 230 performs a calculation, based on a key derivation function, to generate a key encryption key (KEK) which is used to encrypt a data encryption key (EK) stored on shared data store 150. In one example, the calculation may be based on a PBKDF2 (Password-Based Key Derivation Function 2) algorithm that is part of RSA Laboratories' Public-Key Cryptography Standards (PKCS) series, specifically PKCS #5 v2.0, also published as Internet Engineering Task Force's RFC 2898.

It will be understood that PBKDF2 is only one mathematical algorithm which may be used to produce a key (KEK). In other embodiments, alternative key derivation functions may be used to generate the KEK, for example, the bcrypt key derivation function, and the more recently developed scrypt key derivation function, which can use larger amounts of memory and are therefore more resistant to ASIC and GPU attacks.

In various embodiments, the key derivation function used to generate a KEK uses two inputs: a registration password and a salt. It will be understood that the key derivation function need not always use a salt as an input. In some embodiments, a KEK may be generated using an algorithm which uses only a single input—whether a registration password or another value.

Performing a hashing or other key derivation functions on the registration password or passphrase in order to generate the KEK provides further protection in the event that the secrecy of the registration password or passphrase is somehow compromised.

Once a KEK is generated by key derivation module 180, the KEK is stored in a secure local persistent and secure storage 220. In this manner, the KEK is kept secret or hidden within the client entities themselves.

Some operating systems offer capabilities for local persistent storage; in other embodiments, specific local persistent storage may be created for purposes of the encryption scheme. In some embodiments, client entities that do not have a facility to securely keep data in a local persistence shall still be able to participate in the encryption scheme, but it must be visible that such entities might exist, for example, by the entity providing a notification to a system administrator.

In some embodiments, if an instance does not have such capability, the decision whether the encryption scheme is extended to that client entity may depend on an indicator stored on the shared medium, for example, shared data store 150. In some embodiments, this allows an administrator to determine whether the overall security level of the sum of all client entities is either "Secure" or "Some insecure instances might exist", for example.

Figure 3:
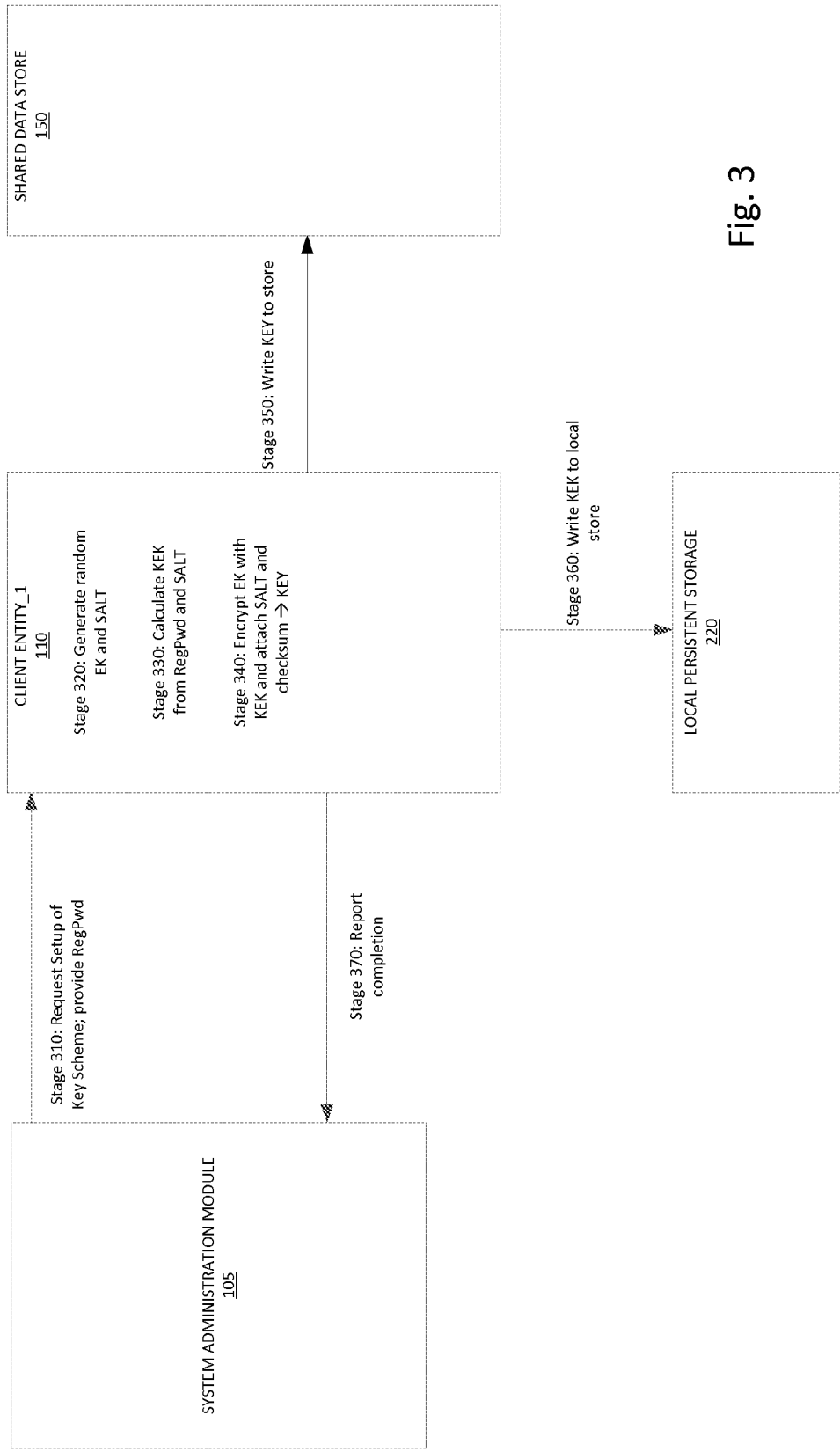
FIG. 3 is a block diagram presenting actions performed at different stages of a process for setting up an improved key encryption scheme according to one embodiment of the present invention.

FIG. 3 is a block diagram illustrating a procedure (also depicted in FIG. 4) for setting up an improved encryption scheme in accordance with one embodiment of the present disclosure.

The improved encryption scheme set up process is depicted in FIG. 3 by reference to different stages (identified by element numbers) of the process. FIG. 3 shows those stages in the context of the configuration of entities depicted in FIGS. 1 and 2. It will be understood that the sequence of actions depicted in FIG. 3 is intended to provide one example embodiment. Other embodiments with a different sequence of events or stages, or with particular events or stages left out, may still reflect the spirit behind various embodiments of this disclosure.

Further, while the improved encryption scheme set up process is described with reference to some of the entities depicted in FIGS. 1 and 2 for ease of description, in practice, it may be implemented on a variety of network contexts and network configurations. That is, it will be understood that the particular configuration of entities depicted in FIG. 3 could be altered without departing from the spirit of the invention.

As illustrated in FIG. 3, at stage 310 system administration module 105 sends a request to setup an encryption key scheme to a first client entity 110 who is authorized to access sensitive data stored on shared data store 150. System administration module 105 may be an installation or system administering software module according to some embodiments.

According to other embodiments, system administration module 105 may also be replaced with a human system administrator interacting with client entity 110 through a front end or user interface provided by first client entity 110, for example.

In one example, the installer component may be operated by a human administrator. The administrator may respond to queries from an installation script to provide technical parameters regarding installation of the new client instance or entity. In one example, she may be queried whether secure data store should be enabled, and if the administrator selects this option, the system may ask for a registration password or passphrase to be input, for example. In some examples, the registration password is something which the administrator or orchestrating software manages in a secure fashion and keeps secret. In various embodiments, it is the synchronization point or shared secret that holds the encryption scheme together.

In embodiments where a human administrator is required to remember or maintain the password, the registration password may be a string. In other embodiments, if the password is being stored, for example, in a computing device, the registration password may be a binary object.

In some embodiments, prior to stage 310, a shared data store 150, and a client entity 110, may exist, but no encryption scheme is yet in place for protecting sensitive data.

Returning to FIG. 3, as part of stage 310, in connection with requesting setup of a key scheme, system administration module 105 sends a registration password or passphrase to client entity 110.

In stage 320, first client entity 110 generates an encryption key (EK). It also generates a salt (using random salt generator 240) to be used in generating the key encryption key (KEK).

Note that while in the embodiment illustrated in FIG. 3, the encryption key EK is generated by first client entity 110, in other embodiments, the encryption key may be generated by system administration module 105 or another entity not depicted which then sends the key to first client entity 110. For example, an installer component could assist by generating some cryptographic key material.

Figure 5:
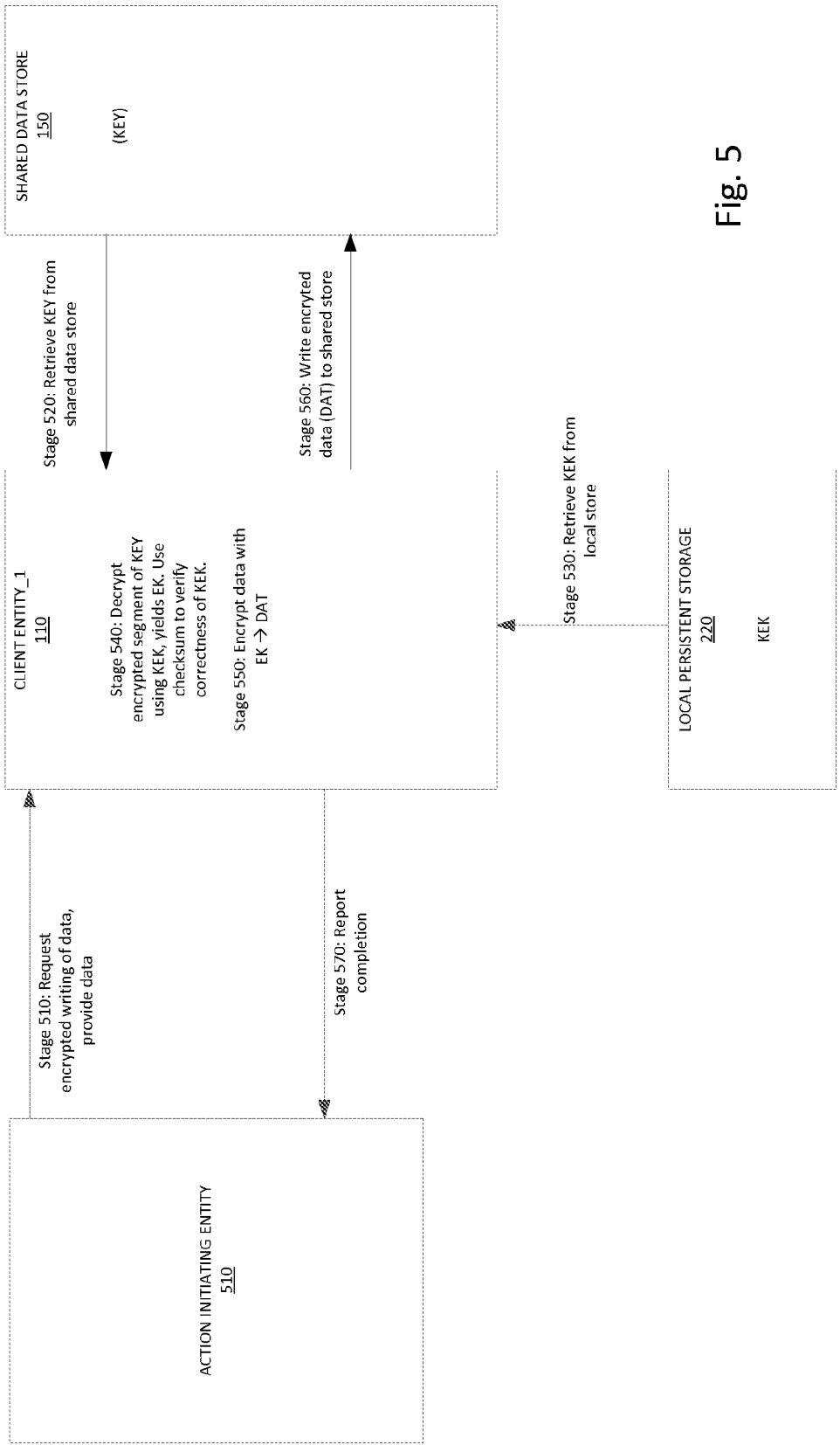
FIG. 5 is a block diagram presenting actions performed at different stages of a process for writing data in connection with an improved key encryption scheme according to one embodiment of the present invention.

Once generated, the encryption key (EK) can be used for encrypting sensitive data stored in shared data store 150 as discussed further with regard to FIG. 5.

At stage 330, key derivation module 230 of first client entity 110 generates a key encryption key (KEK) using the registration password or passphrase received from system administration module 105 in 310, and the salt it locally generated at 320, as inputs to a key derivation calculation. As noted above, in various embodiments, the key derivation function used by key derivation module 230 to generate a KEK may require two inputs.

In some embodiments, key derivation module 230 applies a pseudorandom function (e.g., a cryptographic hash, cipher, or HMAC function) to the input registration password or passphrase (RegPwd) along with the salt value it generated and repeats the process many times (often over 1000 times, depending on a CPU speeds) to produce a key encryption key KEK. In some embodiments, the KEK is a fixed length cryptographic key.

The derived KEK may then be used as a cryptographic key in subsequent operations to encrypt the encryption key EK used for encrypting data. Once encrypted, the EK is stored in shared data store 150 along with the data encrypted using the EK.

In cryptography, a salt is a randomly generated value used as an additional input to a one-way function that hashes a password or passphrase, for example. One function of salts is to protect against situations where an attacker seeks to reverse engineer a password or passphrase. Among other things, salts can be used to defend against dictionary attacks and pre-computed rainbow table attacks. Another function of salts is to prevent a result where a same encryption key is generated by two separate applications of a key derivation algorithm because the inputs to the two separate calculations happen to be the same. By salting, the non-predictability of the encrypted EK can be made more likely. Salt tries to ensure that if two administrators are using the same password, the resulting KEK is not the same, for example.

As noted above, the second input (in addition to the salt used by key derivation module 230 to generate a KEK) is the registration password or passphrase (RegPwd) which is received from system administration module 105 in various embodiments.

As noted above, in some embodiments, the key derivation function applied by key derivation module 230 is a PBKDF2 (Password-Based Key Derivation Function 2) algorithm.

The computations performed by key derivation module 230 makes cracking the registration password or passphrase (RegPwd) much more difficult.

In stage 340, first client entity 110 encrypts the encryption key (EK) with the key encryption key (KEK) it derives in stage 340. The encrypted EK is then associated with the salt value and a checksum. In various embodiments, where shared data store 150 is configured as a file system, the associating of the encrypted EK, salt, and checksum, may be performed by creating a file entity that contains each of these elements. In one example, such a KEY file is given the suffix ".key" to identify it as a file that contains an encryption key. In some embodiments, the KEY file is the container for the encrypted encryption key; checksum and salt are provided as meta data in the KEY file.

In stage 350, first client entity 110 writes the KEY file to shared data store 150.

In stage 360, first client entity 110 writes the KEK it derived in stage 3 to Local Persistent Storage 220 associated with first client entity 110. The KEK may thereafter be retrieved from Local Persistent Storage 220 by first client entity 110 when first client entity 110 wishes to write or read sensitive data to or from, respectively, the shared medium.

As noted above, the KEK is operable to decrypt or "unlock" an encryption key EK stored in encrypted form on shared data store 150. Once unlocked, the encryption key EK may be used by first client entity 150 either to encrypt data (for a write operation) or decrypt data (for a read operation) in the course of data system operations. That is, in conjunction with the encryption key EK, KEK is able to decrypt or "unlock" data stored in encrypted form on the shared data store. The KEK may also be used, in conjunction with the EK, to encrypt new sensitive data which a user wishes to store on the shared data store.

According to various embodiments, the KEK (unlike the EK) is not stored on a shared medium such as shared data store 150, bur is rather stored in a local persistent secure storage 220 located at (or associated with and accessible by) first client entity 110.

In stage 370, first client entity 110 reports completion of encryption-scheme-set-up to system administration module 105.

As illustrated in FIG. 3, an improved key encryption set up procedure implements an encryption scheme that in some embodiments provides three layers of security.

(i) A data encryption key (EK), stored on shared data store 150, is used to encrypt and decrypt sensitive data stored on shared data store 150, as further described below.

(ii) A key encryption key KEK, stored at Local Protected Storage 220 associated with each client entity or instance authorized to access the sensitive data, is used to encrypt and decrypt the data encryption key EK. Encrypting the data encryption key EK (using the KEK) enables a system to provide a further layer of protection for the data stored on shared data store 150.

(iii) A registration password (RegPwd), input by an administrator or generated by system administrating software, for example, is used as an input to an algorithm that used to generate the KEK.

After the above process for initial set up of the key encryption scheme described in this disclosure is completed, first client entity 110 may then perform read and write operations of sensitive data to shared data store 150 using the EK to encrypt sensitive data as described in further detail in connection with FIGS. 5 and 6.

Figure 4:
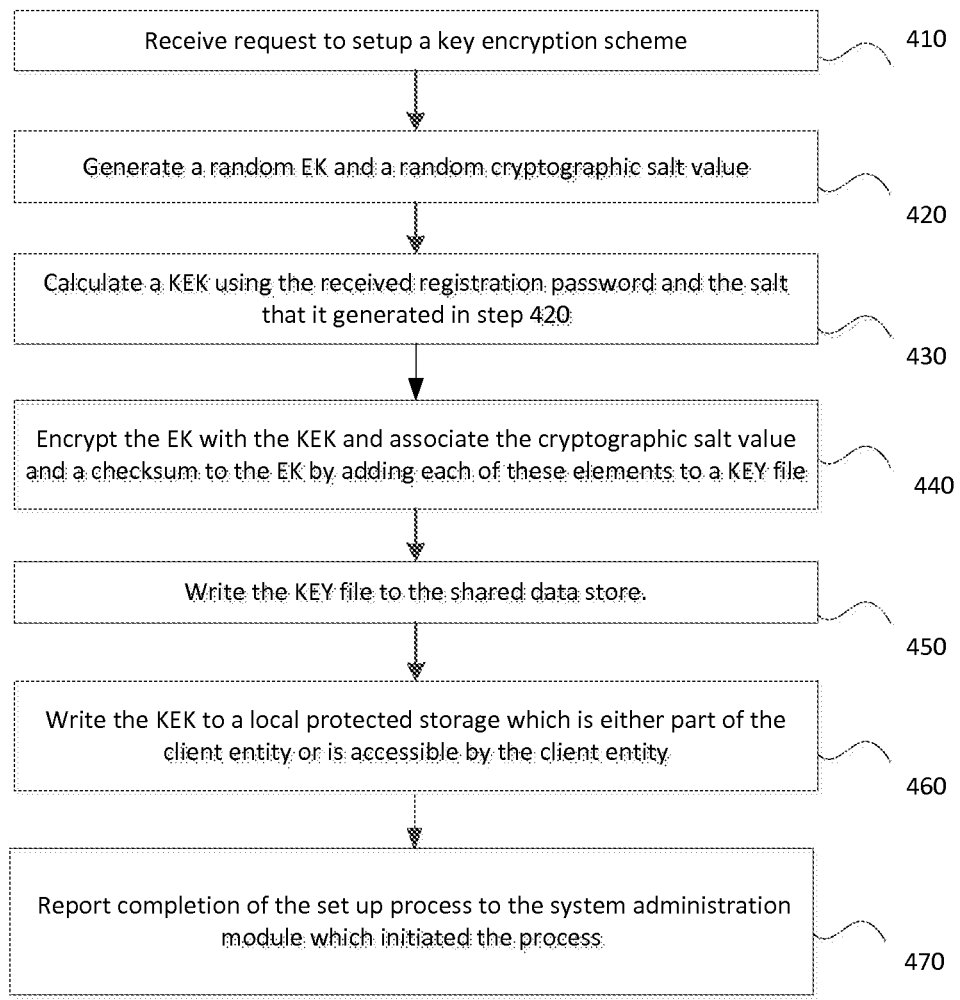
FIG. 4 is a flow diagram illustrating a process for setting up an improved key encryption scheme from the perspective of a client entity according to one embodiment of the present invention.

FIG. 4 is a flow diagram illustrating a procedure for setting up an improved encryption scheme in the context of a shared data store, in accordance with one embodiment of the present disclosure, from the perspective of a client entity.

In 410, the client entity receives request to setup a key encryption scheme, as well as a registration password to be used in generating a KEK for the key scheme, from a human administrator or a system administration module.

In 420, the client entity generates a random EK and a random salt value.

In 430, the client entity calculates a KEK using the received registration password and the salt that it generated in step 420.

In 440, the client entity encrypts the EK with the KEK and associates the salt value and a checksum to the encrypted EK. Where the shared data store consists of a file system, such associating may involve adding each of these elements to a KEY file.

In 450, the client entity writes the KEY file to the shared data store.

In 460, the client entity writes the KEK to a local protected storage which is either part of the client entity or is accessible by the client entity.

In 470, the client entity reports completion of the set up process to the human administrator or the system administration module which initiated the process.

FIG. 5 is a block diagram illustrating a procedure for writing data to a shared data store, where the procedure uses an improved encryption scheme in accordance with one embodiment of the present disclosure.

The improved encryption scheme's write process is depicted in FIG. 5 with reference to different stages. FIG. 5 shows those stages in the context of a configuration of entities including first client entity 110, shared data store 150, local persistent storage 220, and an action initiating entity 510. It will be understood that the sequence of actions depicted in FIG. 5 is intended to provide one example embodiment. Other embodiments with a different sequence of events or stages, or with particular events or stages left out, may still reflect the spirit behind various embodiments of this disclosure.

Further, it will be understood that the particular configuration of entities depicted in FIG. 5 could be altered without departing from the spirit of the invention.

As illustrated in FIG. 5, at stage 510, the action initiating entity 510 sends a request for a writing of data, the data to be written on the data store in encrypted form. The request is sent to first client entity 110, and includes a request to write data to shared data store 150. The request also provides the data to be written to shared data store 150. In some embodiments, the action initiating entity 510 may be a human actor inputting a request to store data to first client entity 110. In other embodiments, action initiating entity 510 may be a network entity or other computing device.

In stage 520, first client entity 110 retrieves the KEY file containing the encryption key to be used for encrypting sensitive data from shared data store 150. The KEY file contains the encrypted encryption key EK. Note that in the illustrated embodiment, the KEY file in shared data store 150 is depicted with parentheses around it to indicate that the KEY file contains an encrypted encryption key EK. The EK was encrypted, placed in the KEY file, and stored in shared data store 150 during the key encryption set up process described in FIGS. 3 and 4.

In stage 530, first client entity 110 retrieves the key encryption key (KEK) from local persistent storage 220 associated with first client entity 110.

In stage 540, first client entity 110 decrypts the encrypted segment of the KEY file using the KEK; this yields the EK. First client entity 110 also uses a checksum stored in the KEY file on the EK to verify the correctness of the retrieved KEK.

In stage 550, first client entity 110 encrypts the data sent by the action initiating entity 510 using the EK; this produces an encrypted data file In stage 560, first client entity 110 writes the encrypted data file (DAT) to shared data store 150.

In stage 570, first client entity 110 reports completion of the write operation to the action initiating entity 510.

Figure 6:
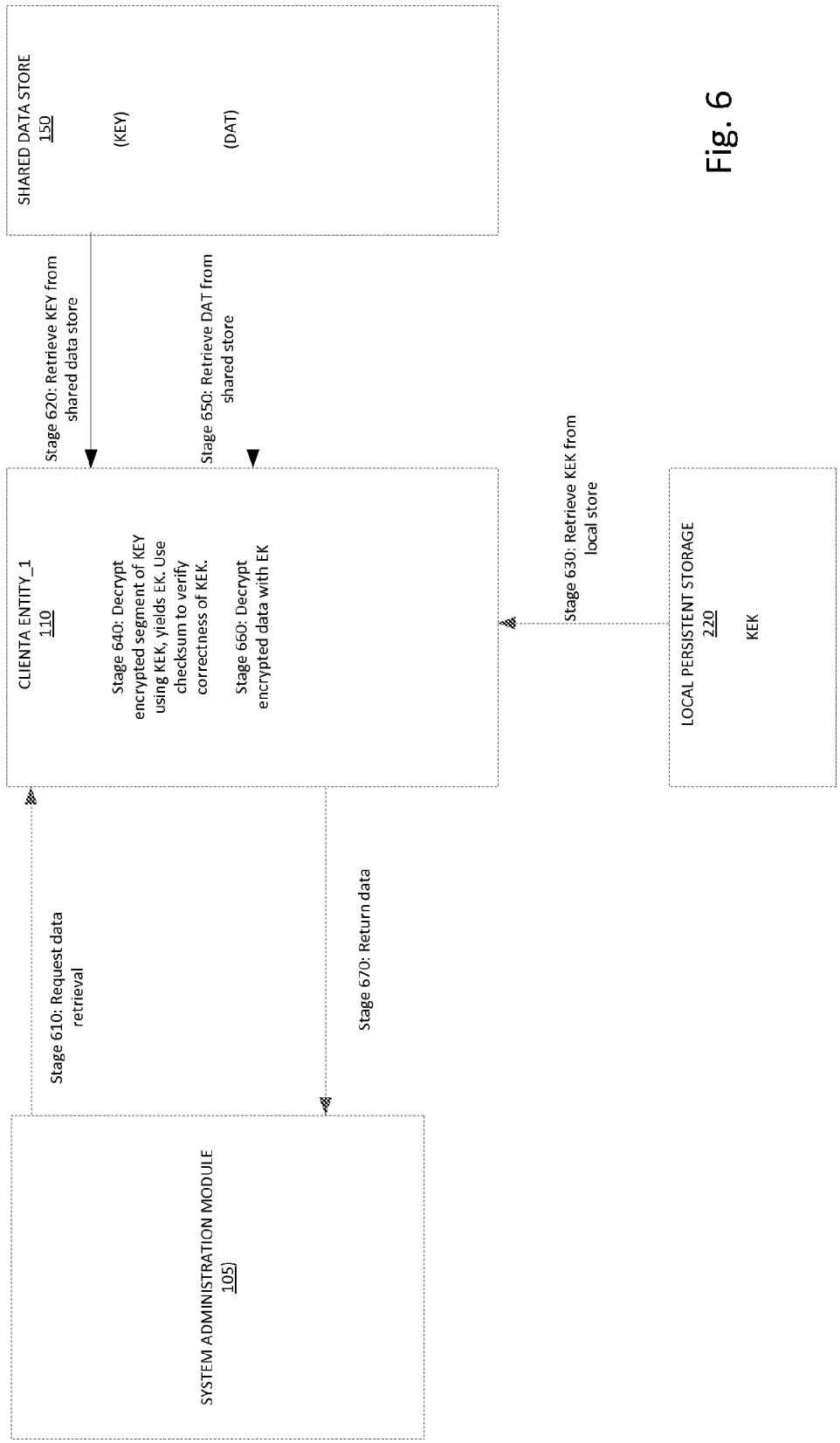
FIG. 6 is a block diagram presenting actions performed at different stages of a process for reading data in connection with an improved key encryption scheme according to one embodiment of the present invention.

FIG. 6 is a block diagram illustrating a procedure for reading data from a shared data store, where the procedure uses an improved encryption scheme in accordance with one embodiment of the present disclosure.

The improved encryption scheme's read process is depicted in FIG. 6 with reference to different stages. FIG. 6 shows those stages in the context of a configuration of entities including first client entity 110, shared data store 150, local persistent storage 220, and an action initiating entity 610. It will be understood that the sequence of actions depicted in FIG. 6 is intended to provide one example embodiment. Other embodiments with a different sequence of events or stages, or with particular events or stages left out, may still reflect the spirit behind various embodiments of this disclosure.

Further, it will be understood that the particular configuration of entities depicted in FIG. 6 could be altered without departing from the spirit of the invention.

As illustrated in FIG. 6, at stage 610, action initiating entity 610 sends a request to retrieve data from shared data store 150 to first client entity 110.

At 620, first client entity 110 retrieves the KEY file from shared data store 150. It retrieves the KEY file because it learns that the data which action initiating entity 610 has requested is encrypted. In some embodiments, first client entity 110 learns that the requested data is encrypted from action initiating entity 610 as part of the initial request to retrieve data. In some embodiments, first client entity 110 determines that the requested data is encrypted through information it either receives from shared data store 150 or figures out on its own by reviewing the requested data file. For example, secure storage module 210 of first client entity 110 may have some intelligence, such that it may find the requested data is encrypted, and will search shared data store 149 to determine whether there is a KEY file. Upon locating the KEY file, it may determine that it needs a KEK to decrypt the EK contained in the KEY file.

Note that, in various embodiments, providing a capability for action initiating entity 610 to specify that requested data be encrypted may be extended to provide a mechanism whereby the action initiating entity can ensure that the data it receives has been stored securely. For example, it may be desirable for a software component that deals with credit card numbers to refuse to work with data that has not been stored securely. By providing a demand that requested data be encrypted, action initiating entity 610 can ensure, for example, that client entity 110 returns an error message when it finds it retrieved has not been encrypted. Alternatively, in various embodiments, action initiating entity 610 may ask the client entity to return not only the data, but also meta data information about the storage properties of the data (e.g., was it encrypted), so that action initiating entity 610 can decide based upon such information whether to use or refuse the data.

At stage 630, first client entity 110 retrieves the KEK stored in local persistent storage 220.

At stage 640, first client entity 110 decrypts the encrypted segment of the KEY file using the KEK; this yields the data encryption key (EK). In this stage, first client entity 110 also uses a checksum stored in the KEY file on the EK to verify the correctness of the retrieved KEK. By checksum, the consistency of the encrypted EK is ensured.

Note that access to the KEY file on shared data store 150 does not give access to the encrypted data stored on the shared data store, as long as the KEK is not known to an attacker.

The KEK is not used to encrypt the payload data (in the DAT file). This is the task performed by the encryption key EK. However, without the KEK, an attacker is unable to decrypt the EK, which the attacker needs to decrypt the data. Ability to read or update secure storage on shared data store 150 is therefore bound to the knowledge of the correct KEK.

At stage 650, first client entity 110 retrieves the requested data file, denoted DAT in FIG. 6, from shared data store 150. Note that the DAT file is depicted with parentheses around it in FIG. 6 to denote that in the write operation (described in FIG. 5) in which the data file was stored in shared data store 150, the data was encrypted prior to being stored.

At stage 660, first client entity 110 decrypts the encrypted data in the DAT file using the EK.

At stage 670, first client entity 110 returns the requested data to action initiating entity 610 which originally requested the data.

As shown above, in some embodiments, first client entity 110 uses the KEK to encrypt the EK, and then writes encrypted EK into the KEY file, and then sends the KEY file through unprotected communication channels to an unprotected data store.

Figure 7:
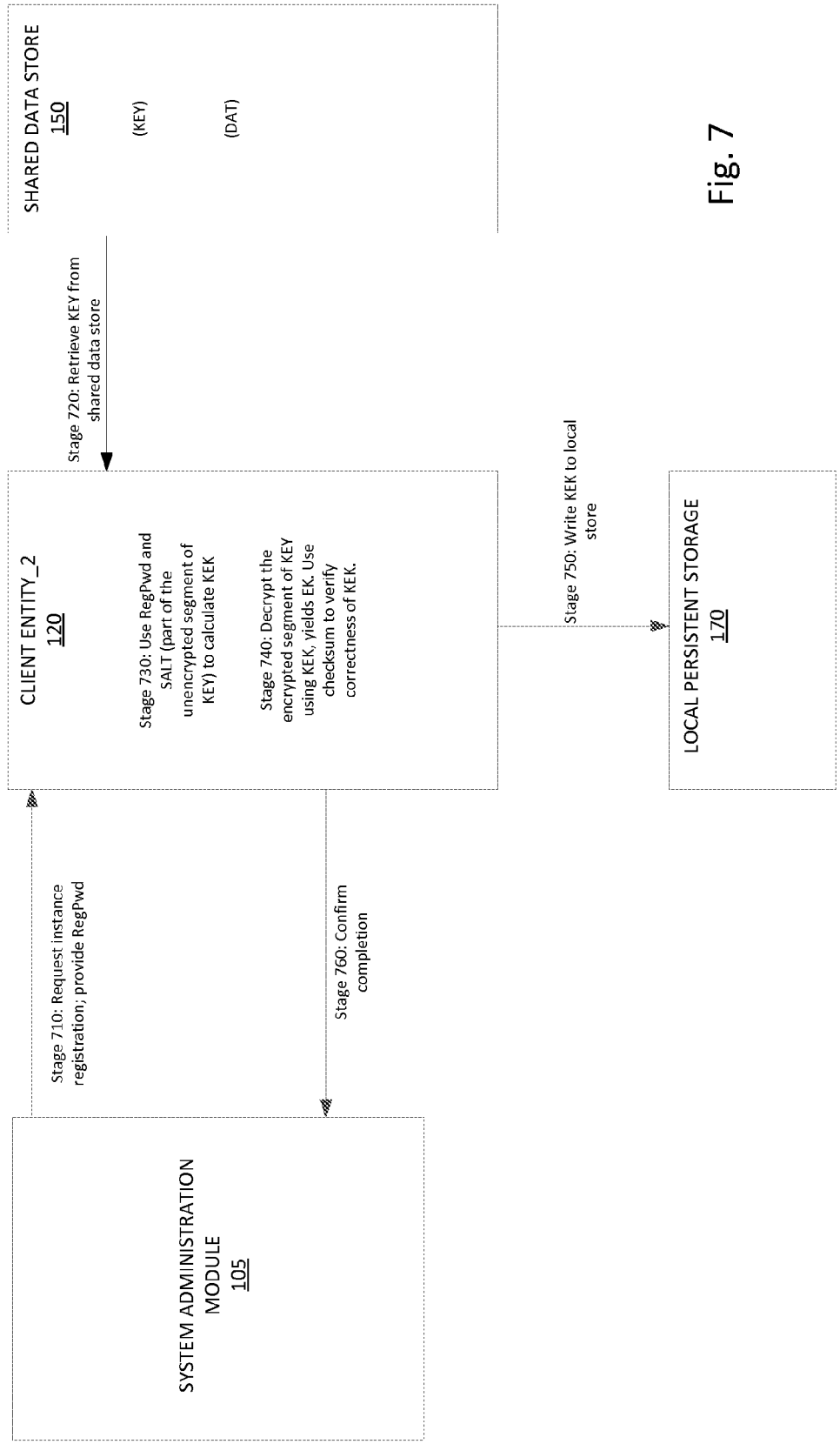
FIG. 7 is a block diagram presenting actions performed at different stages of a process for registering a new client entity in connection with an improved key encryption scheme, after the key encryption scheme has already been set up by another client entity, according to one embodiment of the present invention.

FIG. 7 is a block diagram illustrating a procedure for registering a second or later client entity to participate in an improved encryption scheme originally set up by first client entity 110 in a process described in FIGS. 3 and 4, in accordance with one embodiment of the present disclosure.

The improved encryption scheme's registration process is depicted in FIG. 7 with reference to different stages. FIG. 7 shows those stages in the context of a configuration of entities including first client entity 110, shared data store 150, local persistent storage 220, and system administration entity 105. It will be understood that the sequence of actions depicted in FIG. 7 is intended to provide one example embodiment. Other embodiments with a different sequence of events or stages, or with particular events or stages left out, may still reflect the spirit behind various embodiments of this disclosure.

Further, it will be understood that the particular configuration of entities depicted in FIG. 7 could be altered without departing from the spirit of the invention.

Various embodiments of the present disclosure provide systems and techniques for storing a data encryption key, itself encrypted, in the same data store as encrypted data (encrypted using the encryption key).

According to one embodiment, each client entity authorized to access sensitive data on the shared data store needs to perform certain initializing steps in order to participate in the encryption scheme. FIG. 7 illustrates one such registration process.

At the heart of the registration process is getting access to the KEK. With the KEK serving as the locally stored entity that gives access to the secure storage on shared data store 150, each client entity desiring access to data in secure storage must initially get access to the KEK.

The process of getting knowledge of the KEK is described as a "registration" process, by which a newly created client instance or entity is included into the closed circle of entities allowed to access the data in the secure storage.

Central to the registration process is the element called "Registration Password" (RegPwd). The RegPwd, together with a random salt stored in the global KEY file, act as inputs for a key derivation function (in some embodiments, PBKDF2) whose output is the KEK. The salt itself is not secret; as discussed above, it is stored in unencrypted form on shared data store 159. It is used in the calculations to protect against pre-computed rainbow table attacks, for example.

As illustrated in FIG. 7, at stage 710, system administration module 105 sends a request to second client entity 120 for second client entity 120 to register with the encryption scheme. In stage 1, system administration module 105 also provides a registration password.

According to some embodiments, as part of a registration process, each trusted client entity is required to independently generate a KEK, the KEK to be used to decrypt the EK stored on the shared data store. In order to ensure that the same KEK is generated by each client entity participating in the encryption scheme, the system administration module or other entity initiating the registration process must provide the same registration password every time a new instance is added the encryption domain that is to have access to the secure storage on shared data store 150.

In stage 720, second client entity 120 retrieves the KEY file from shared data store 150.

In stage 730, second client entity 120 uses the registration password provided by system administration module 105, and a salt retrieved from the unencrypted segment of the KEY file to calculate the KEK. Note that the salt was initially stored in the KEY file as part of the initial set up process for the improved key encryption scheme described in FIGS. 3 and 4. That is, second client entity 120 does not have to generate a salt, because it already has a salt, the one first client entity 110 has generated and stored in the KEY file. The salt is stored in unencrypted form so that second client entity 120 and other client entities can read it.

In some embodiments, the salt is originally randomly generated at first client entity 110, when first client entity 110 set up the encryption scheme. Thereafter, during the lifetime of the KEK, the salt remains unchanged and is retrieved by subsequent client entities seeking to register with the encryption scheme by retrieving the salt from the KEY file.

In stage 740, second client entity 120 decrypts the encrypted segment of the KEY file using the KEK; this yields the EK. Second client entity 120 also uses a checksum stored in the KEY file on the EK to verify the correctness of the KEK generated in stage 730. Using the checksum to verify that the KEK is correct confirms that the correct registration password was input, among other things.

Now second client entity 220 has the KEK, and can use it to decrypt the EK and work with the EK to read and write encrypted data. For example, second client entity can now access the encrypted data stored in shared data store 150 because it has access through the KEK.

In stage 750, second client entity 120 writes the KEK to local persistent storage 220.

In stage 760, second client entity 120 confirms the completion of the registration process for second client entity 120 to system administration module 105.

Note that, while FIG. 7 pictures shared data store 150 as containing encrypted data DAT, it is not relevant whether data (a DAT file) already exists or not for purposes of the registration procedure for registering a new client entity/instance that is depicted in FIG. 7. In other words, the registration process is independent of the presence of a DAT file and works even without a DAT file existing.

There may be a need to re-encrypt all or a portion of the data stored on shared data store 150 when a flaw is discovered in an original encryption algorithm, or because of requirements (e.g., legal requirements) that mandate that data be re-encrypted on a periodic basis, for example.

One challenge of performing re-encryption is ensuring that a new key needed for encryption/decryption is distributed to all trusted entities in a manner that avoids data access disruptions. As noted above, various embodiments address the challenge of distributing keys by replacing this process, with a new process that involves storing the encryption key itself on shared data store 150.

Once an improved encryption scheme is implemented as described above, a re-encryption process may take place without raising any difficulties regarding key distribution.

In one example re-encryption process, a new encryption key may be generated at a client entity performing the re-encryption. The data may be re-encrypted using the new key after having locked other client entities from accessing data so no data confusion occurs. When the re-encryption is completed, the client entity may encrypt the new EK with the KEK and also update the KEY file. This may involve replacing the existing KEY stored on the shared data store with a new KEY file that includes the new encrypted EK.

Note that, even where an existing EK is replaced with a new EK, there is no need to replace or alter the KEK that is used to encrypt and decrypt the encryption key EK. The KEK created by a first client entity during an initial set up process for an encryption scheme may continue to be used through the lifetime of an encryption scheme even as new encryption keys EK come and go. In various embodiments, the confidentiality of the KEK is ensured through at least two safeguards: (i) the KEK is created by a client entity as the result of calculations performed within the client entity, and thus there is no need for a human administrator to ever know the details of the key itself. And (ii) the KEK is not distributed or sent between different entities, but rather once created the key is stored in a local protected storage of the client entity which created it, and is not distributed over any network connections.

Figure 8:
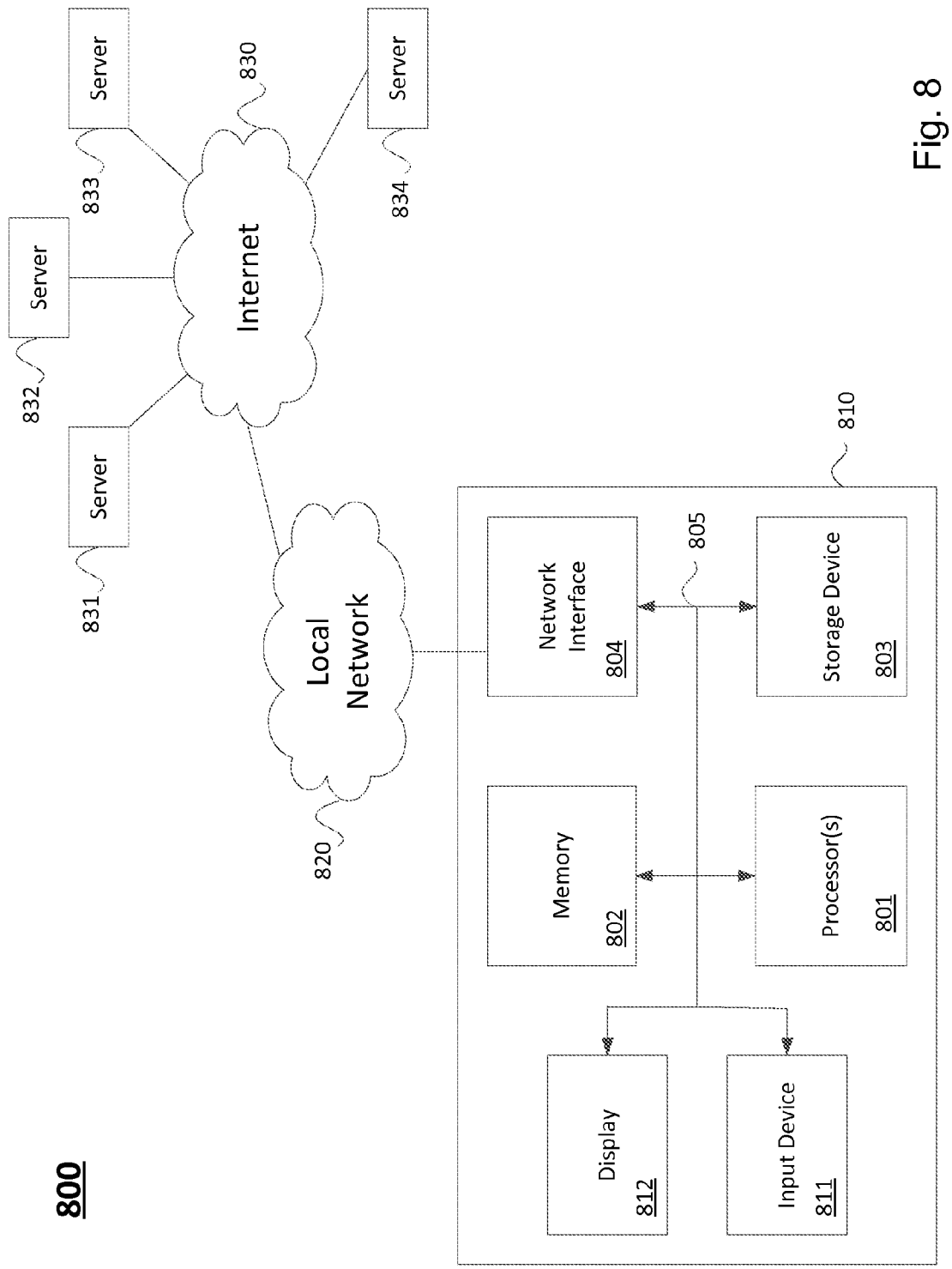
FIG. 8 illustrates hardware of a special purpose computing machine configured to perform a process according to various embodiments of the present invention.

FIG. 8 illustrates hardware of a special purpose computing machine configured with a process according to the above disclosure. The following hardware description is merely one example. It is to be understood that a variety of computer topologies may be used to implement the above described techniques. An example computer system 810 is illustrated in FIG. 8. Computer system 810 includes a bus 805 or other communication mechanism for communicating information, and one or more processor(s) 801 coupled with bus 805 for processing information. One or more processor(s) 801 may take various forms including microcontrollers and microprocessors such as programmable devices (e.g., CPLDs and FPGAs) and unprogrammable devices such as gate array ASICs or general purpose microprocessors. Computer system 810 also includes a memory 802 coupled to bus 805 for storing information and instructions to be executed by processor 801, including information and instructions for performing some of the techniques described above, for example. This memory may also be used for storing programs executed by processor 801. Memory 802 may comprise a single or multiple storage components or devices. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 903 may include source code, binary code, or software files for performing the techniques above, for example. Storage device and memory may both include any suitable non-transitory computer-readable media such as those described herein. Memory 802 and storage device 803 may comprise a single or multiple memory or storage components or devices, respectively.

Computer system 810 may be coupled via bus 805 to an output device 812 for providing information to a computer user. Output device 812 may take the form of a display or speakers, for example. An input device 811 such as a keyboard, touchscreen, mouse, and/or microphone, may be coupled to bus 805 for communicating information and command selections from the user to processor 801. The combination of these components allows the user to communicate with the system. In some systems, bus 705 may represent multiple specialized buses, for example.

Computer system 810 also includes a network interface 804 coupled with bus 805. Network interface 804 may provide two-way data communication between computer system 810 and a local network 820. The network interface 804 may be a wireless or wired connection, for example. Computer system 810 may send and receive information through the network interface 804 across a local area network, an Intranet, a cellular network, or the Internet, for example. One example implementation may include computing system 810 acting as client application server that performs steps relating to implementing an improved encryption scheme for data store and retrieved from a shared data store. In the Internet example, computing system 810 may be accessed by the mobile devices through a wireless connection to the Internet, for example, and computing system 810 may access data and features on backend systems that may reside on multiple different hardware servers 831-835 across the network. Servers 831-835 and server applications may also reside in a cloud computing environment, for example. Various embodiments may be practiced in a wide variety of network environments including, for example, TCP/IP-based networks, telecommunications networks, cellular communications networks, wireless networks, etc., or combinations of different network types.

As noted above, the apparatuses, methods, and techniques described below may be implemented as a computer program (software) executing on one or more computers. The computer program may further be stored on a tangible non-transitory computer readable medium, such as a memory or disk, for example. A computer readable medium may include instructions for performing the processes described herein. Examples of such computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM).

In addition, the computer program instructions with which various embodiments of this disclosure are implemented may be executed according to a variety of computing models including a client/server model, a peer-to-peer model, on a stand-alone computing device, or according to a distributed computing model in which various functions described herein may be performed at different locations.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed:

1. A method comprising:
receiving, on a first computing device, a registration password, the registration password provided to a plurality of client instances for registering the client instances to participate in a secure storage facility on a shared data store, the secure storage facility implemented using a key encryption scheme;
generating or receiving, on the first computing device, a first encryption key to be used in the key encryption scheme;
calculating a key encryption key to be used to encrypt the first encryption key, the key encryption key calculated based at least in part on the registration password;
encrypting the first encryption key with the key encryption key;
creating a key element comprising the encrypted first encryption key;
storing the key element on the shared data store;
storing the key encryption key on a local persistent data store of the computing device;
after storing the first encryption key on the shared data store,
receiving, on a second computing device, the registration password;
retrieving, on the second computing device, the key element that contains the first encryption key from the shared data store;
retrieving, on the second computing device, a salt from an unencrypted segment of the key element;
using, on the second computing device, the registration password and the salt to calculate the key encryption key;
using, on the second computing device, a checksum retrieved from an unencrypted segment of the key element to verify the correctness of the received registration password; and
storing, on the second computing device, the key encryption key in a local, persistent data store associated with the second computing device.

2. The method of claim 1 further comprising:
retrieving the key element that contains the first encryption key from the shared data store;
retrieving data encrypted using the first encryption key from the shared data store;
retrieving the key encryption key stored in the local persistent data store;
using the key encryption key to decrypt an encrypted segment of the key element to retrieve the first encryption key;
using the first encryption key to decrypt the encrypted data retrieved from the shared data store.

3. The method of claim 1 further comprising:
retrieving the key element that contains the first encryption key from the shared data store;
retrieving the key encryption key stored in the local, persistent data store;
using the key encryption key to decrypt an encrypted segment of the key element to retrieve the first encryption key;
encrypting a first data with the first encryption key; and
storing the encrypted first data in the shared data store.

4. The method of claim 1, further comprising:
generating a random salt;
using the salt as an input to the calculation used to generate the key encryption key.

5. The method of claim 4, wherein the key element comprising the encrypted first encryption key also comprises the salt.

6. The method of claim 1, wherein further comprising decrypting, on the second computing device, the encrypted segment of the key element using the key encryption key to retrieve the first encryption key.

7. A computer system comprises:
one or more processors; and
a non-transitory computer readable medium having stored thereon one or more programs, which when executed by the one or more processors, causes the one or more processors to singly or in combination:
receive a registration password, the registration password provided to a plurality of client instances for registering the client instances to participate in a secure storage facility on a shared data store, the secure storage facility implemented using a key encryption scheme;
generate or receive a first encryption key to be used in the key encryption scheme;
calculate a key encryption key to be used to encrypt the first encryption key, the key encryption key calculated based at least in part on the registration password;
encrypt the first encryption key with the key encryption key;
create a key element comprising the encrypted first encryption key;
store the key element on the shared data store;
store the key encryption key on a local persistent data store associated with the computer system;
wherein after the first encryption key is stored on the shared data store, the one or more programs causes a second computer system to:
receive the registration password;
retrieve the key element that contains the first encryption key from the shared data store;
retrieve the salt from an unencrypted segment of the key element;
use the registration password and the salt to calculate the key encryption key; and
store the key encryption key in a local, persistent data store associated with the second computer system.

8. The computer system of claim 7, wherein the one or more programs, when executed by the one or more processors, further causes the one or more processors to singly or in combination:
retrieve the key element that contains the first encryption key from the shared data store;

retrieve data encrypted using the first encryption key from the shared data store;

retrieve the key encryption key stored in the local persistent data store;

use the key encryption key to decrypt an encrypted segment of the key element to retrieve the first encryption key; and use the first encryption key to decrypt the encrypted data retrieved from the shared data store.

9. The computer system of claim 7, wherein the one or more programs, when executed by the one or more processors, further causes the one or more processors to singly or in combination:

retrieve the key element that contains the first encryption key from the shared data store;

retrieve the key encryption key stored in the local, persistent data store;

use the key encryption key to decrypt an encrypted segment of the key element to retrieve the first encryption key;

encrypt a first data with the first encryption key; and store the encrypted first data in the shared data store.

10. The computer system of claim 7, wherein the one or more programs, when executed by the one or more processors, further causes the one or more processor to singly or in combination:

generate the random salt;

use the salt as an input to the calculation used to generate the key encryption key.

11. The computer system of claim 10, wherein the key element comprising the first encryption key also comprises the salt.

12. The computer system of claim 7, wherein the second computer system further decrypts the encrypted segment of the key element using the key encryption key to retrieve the first encryption key, and uses a checksum retrieved from an unencrypted segment of the key element to verify the correctness of the key encryption key.

13. A non-transitory computer readable storage medium storing one or more programs, the one or more programs comprising instructions for:

generating or receiving, on a first computing device, a first encryption key to be used in the key encryption scheme;

calculating a key encryption key to be used to encrypt the first encryption key, the key encryption key calculated based at least in part on the registration password;

encrypting the first encryption key with the key encryption key;

creating a key element comprising the encrypted first encryption key;

storing the key element on the shared data store;

storing the key encryption key on a local persistent data store of the computing device;

after storing the first encryption key on the shared data store, receiving, on a second computing device, the registration password;

retrieving, on the second computing device, the key element that contains the first encryption key from the shared data store;

retrieving, on the second computing device, a random salt from an unencrypted segment of the key element;

using, on the second computing device, the registration password and the salt to calculate the key encryption key;

using, on the second computing device, a checksum retrieved from an unencrypted segment of the key element to verify the correctness of the received registration password; and storing, on the second computing device, the key encryption key in a local, persistent data store associated with the second computing device.

14. The non-transitory computer readable storage medium of claim 13, wherein the one or more programs further comprise instructions for:

retrieving the key element that contains the first encryption key from the shared data store;

retrieving data encrypted using the first encryption key from the shared data store;

retrieving the key encryption key stored in the local persistent data store;

using the key encryption key to decrypt an encrypted segment of the key element to retrieve the first encryption key; and using the first encryption key to decrypt the encrypted data retrieved from the shared data store.

* * * * *